United States Patent [19]

Yagi et al.

[11] 4,419,770
[45] Dec. 6, 1983

[54] WRIST AM RADIO RECEIVER

[75] Inventors: Hiroyuki Yagi, Iwaki; Takashi Baba, Machida, both of Japan

[73] Assignee: Sony Corporation, Tokyo, Japan

[21] Appl. No.: 372,189

[22] Filed: Apr. 26, 1982

[30] Foreign Application Priority Data

May 2, 1981 [JP] Japan .................................. 56-67493
Feb. 19, 1982 [JP] Japan .................................. 57-25523

[51] Int. Cl.³ .............................................. H04B 1/08
[52] U.S. Cl. ...................................... 455/301; 368/10;
455/310; 455/344; 455/349; 455/350; 455/351
[58] Field of Search ............... 455/344, 347, 348, 349,
455/350, 351, 89, 90, 300, 301, 310, 317; 368/10

[56] References Cited

U.S. PATENT DOCUMENTS 3,032,651 5/1962 Gisiger-Stähli et al. ............ 455/351
3,983,483 9/1976 Pando .................................... 455/89

FOREIGN PATENT DOCUMENTS 55-91237 7/1980 Japan .................................... 455/351

OTHER PUBLICATIONS

"A Complete Single Chip AM/FM Radio Integrated Circuit"-T. Okanobu et al., Aug. 1982 IEEE Trans. on Consumer Electronics, vol. CE-28, No. 3, pp. 393-408 with emphasis on p. 406.

Primary Examiner—Marc E. Bookbinder
Attorney, Agent, or Firm—Lewis H. Eslinger; Alvin Sinderbrand

[57] ABSTRACT

A wrist AM radio receiver is housed in a bracelet-like structure adapted to be removably wrapped about a user's wrist and includes at least a bar antenna, a circuit board with an oscillating element thereon forming a reference oscillation source, and a speaker, and the bar antenna and the circuit board are spaced apart within the bracelet-like structure in the direction in which the latter is wrapped with the speaker also disposed in the bracelet-like structure between the bar antenna and the circuit board so as to minimize the influence on the bar antenna of pulses from the reference oscillation source.

16 Claims, 8 Drawing Figures

WRIST AM RADIO RECEIVER

BACKGROUND OF THE INVENTION

1. Field of the Invention

This invention relates to a wrist AM radio receiver housed in a bracelet-like structure which is adapted to be removably wrapped about a user's wrist.

2. Description of the Prior Art

In existing AM radio receivers of the type to be worn on a user's wrist, a bar antenna, a speaker, a printed circuit board carrying circuit components, and all other elements of the radio receiver are arranged in a single block or assembly in an attempt to reduce the extent of the radio receiver and permit its being housed in a casing somewhat like that of a wristwatch. However, such arrangement of all of the elements of the AM radio receiver in a single block or assembly causes the same to have an undesirably large thickness, and further results in the bar antenna being relatively strongly influenced by emanations from other circuit components, thus causing noisy reception. The foregoing problem is particularly encountered in radio receivers using a phase-locked loop (PLL) synthesizer for generating the desired local oscillation or in wrist-type radio receivers having an electronic watch combined therewith, in each of which an oscillating elements acts as a reference oscillation source generating reference pulses or frequency-divided pulses to which the bar antenna is sensitive so that electrostatic noise is produced.

Therefore, it has not been considered feasible, in the case of AM radio receivers using a PLL synthesizer or combined with an electronic clock, to reduce the size thereof sufficiently for a wrist radio receiver. Of course, if an AM radio receiver using a PLL synthesizer or combined with an electronic watch is reduced in size so as to be capable of use as a wrist radio receiver, the susceptibility of the bar antenna to the reference pulses or other sources of noise among the receiver components may be substantially reduced by fully shielding all of the components of the receiver from each other. However, for such complete shielding of the receiver components, it may be necessary to employ plural metal layers in the shielding or to use special shielding metals, thereby undesirably increasing the complexity of the assembly and the time and labor required therefor. Further, the metallic layers or plates required for effective shielding will undesirably increase the cost of the materials for the radio receiver and will substantially impair the sensitivity of the reception by the radio receiver.

OBJECTS AND SUMMARY OF THE INVENTION

Accordingly, it is an object of this invention to provide a wrist AM radio receiver which avoids the foregoing problems of the prior art.

More particularly, it is an object of the present invention to provide a wrist AM radio receiver which can be made sufficiently small and thin to be housed in a bracelet-like structure adapted to be removably wrapped about a user's wrist, and which nevertheless provides good sensitivity and clarity of reception while avoiding the generation of noise due to the proximity of circuit components of the radio receiver to the antenna thereof.

Another object of the invention is to provide a wrist AM radio receiver attaining a high reception sensitivity by means of a PLL synthesizer which requires a reference oscillation source, and in which the arrangement of the components of the receiver is such as to minimize the influence on a bar antenna of the receiver of pulses from the reference oscillation source.

Another object of the invention is to provide a wrist AM radio receiver, as aforesaid, which also includes an electronic watch, and in which the reference oscillation source is employed for generating clock pulses for the operation of the electronic watch without influencing the bar antenna.

Still another object of the invention is to provide a wrist AM radio receiver combined with an electronic watch and having a display device selectively operative to display either the frequency to which the radio receiver is tuned or the time indicated by the electronic watch, and which is located for minimizing the size of the assembly while enhancing the isolation of the antenna from the reference oscillation source.

A further object of the invention is to improve the ease and comfort with which a wrist AM radio receiver may be carried on the user's wrist.

A still further object is to provide a wrist AM radio receiver in which an operating panel and pushbuttons buttons extending therefrom for controlling various operating functions of the radio receiver are arranged to avoid inadvertent actuation thereof.

In accordance with an aspect of this invention, a wrist AM radio receiver comprises a bracelet-like structure adapted to be removably wrapped about a user's wrist, a bar antenna, a circuit board having oscillating means thereon forming a reference oscillation source, said bar antenna and circuit board being spaced apart within the bracelet-like structure in the direction in which the latter is wrapped, and at least a speaker is also disposed in the bracelet-like structure between the bar antenna and the oscillating means on the circuit board so as to minimize the influence on the bar antenna of pulses from the reference oscillation source. Desirably, the bracelet-like structure defines a plurality of compartments arranged in succession therein in the direction in which the bracelet-like structure is wrapped, and the bar antenna and circuit board with oscillating means thereon are respectively contained in compartments which are spaced from each other by at least another of the compartments, and the speaker is contained in such other compartment.

In one embodiment of the invention, the compartments containing the bar antenna, the speaker and the circuit board with an oscillating element thereon, respectively, are all disposed in a common main casing having a base member formed with a curved undersurface conforming to the user's wrist contours, and being secured on the wrist by strap elements extending from opposite ends of the main casing and being releasably engaged with each other by means of a clasp or the like.

In another embodiment of the invention, the bracelet-like structure includes a plurality of relatively rigid elements pivotally connected to each other in succession so as to permit the bracelet-like structure to encircle and substantially conform to the contours of the user's wrist, with at least some of such pivotally connected elements being hollow to define respective compartments in which the bar antenna and circuit with an oscillating element are disposed, while the speaker is housed in a compartment therebetween.

In the case where the bracelet-like structure is composed of pivotally connected rigid elements, the successive elements have passages extending longitudinally through their adjacent ends from the compartments respectively defined in such elements, and the pivotal connection is effected by means of a flattened sleeve having end portions loosely engaging in the passages through the adjacent ends of the elements connected thereby, with the end portions of the flattened sleeve being pivotally connected to the respective elements inwardly of the open ends of the passages so that relative angular displacements of the successive pivotally connected elements are limited by the engagement of the sleeve with edges of the passages at the open ends thereof, whereby conductive means, such as, a printed circuit on a flexible substrate, can be extended through each flattened sleeve for effecting electrical connections therethrough without the possibility of damage to such electrical connections, as by pinching thereof, due to excessive relative angular displacements of the pivotally connected elements.

The above, and other objects, features and advantages of the invention, will be apparent in the following detailed description of illustrative embodiments thereof which is to be read in connection with the accompanying drawings forming a part hereof, and wherein the same reference numerals are employed to identify corresponding parts in the several views.

DETAILED DESCRIPTION OF THE PREFERRED EMBODIMENTS

Figure 1:
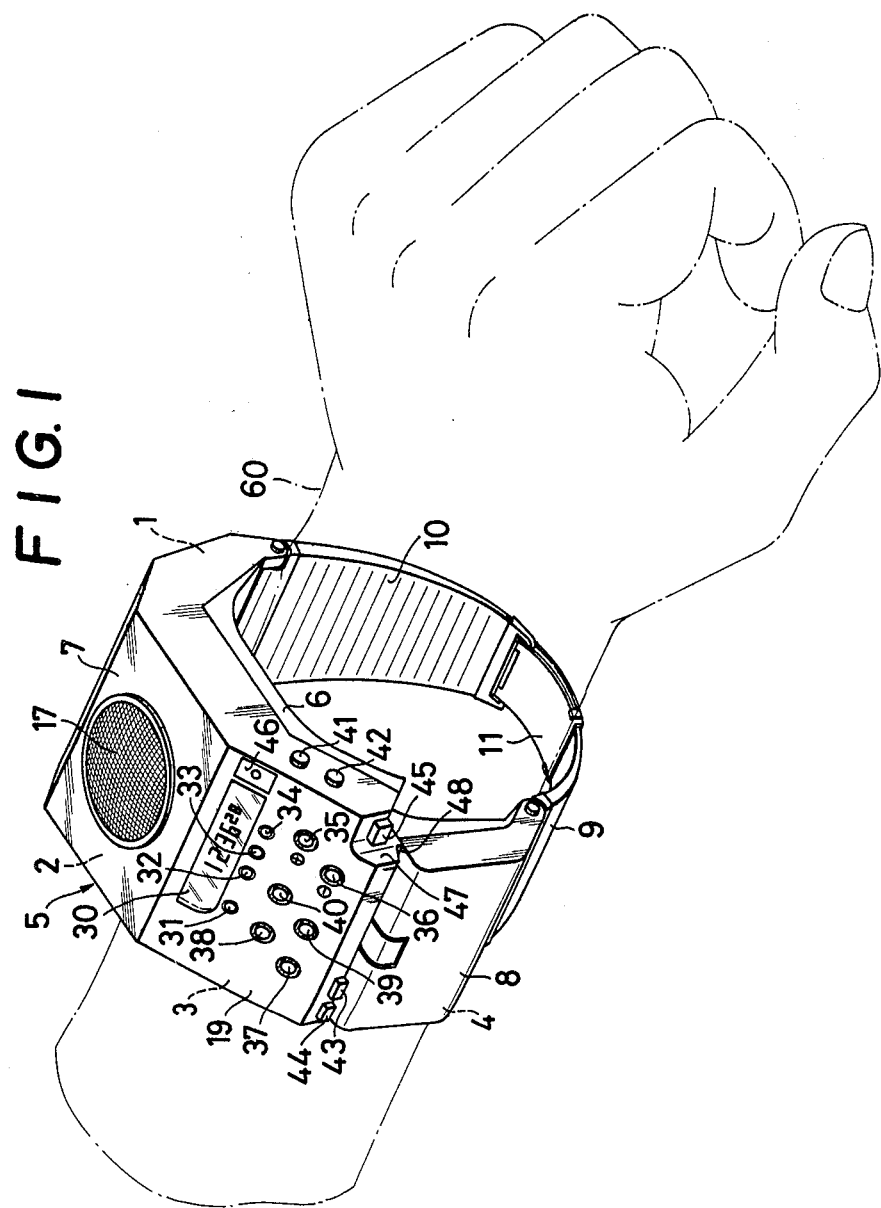
FIG. 1 is a perspective view of a wrist AM radio receiver according to a first embodiment of the invention, and which is shown mounted on or wrapped about a user's wrist appearing in dot-dash lines.
Figure 2:
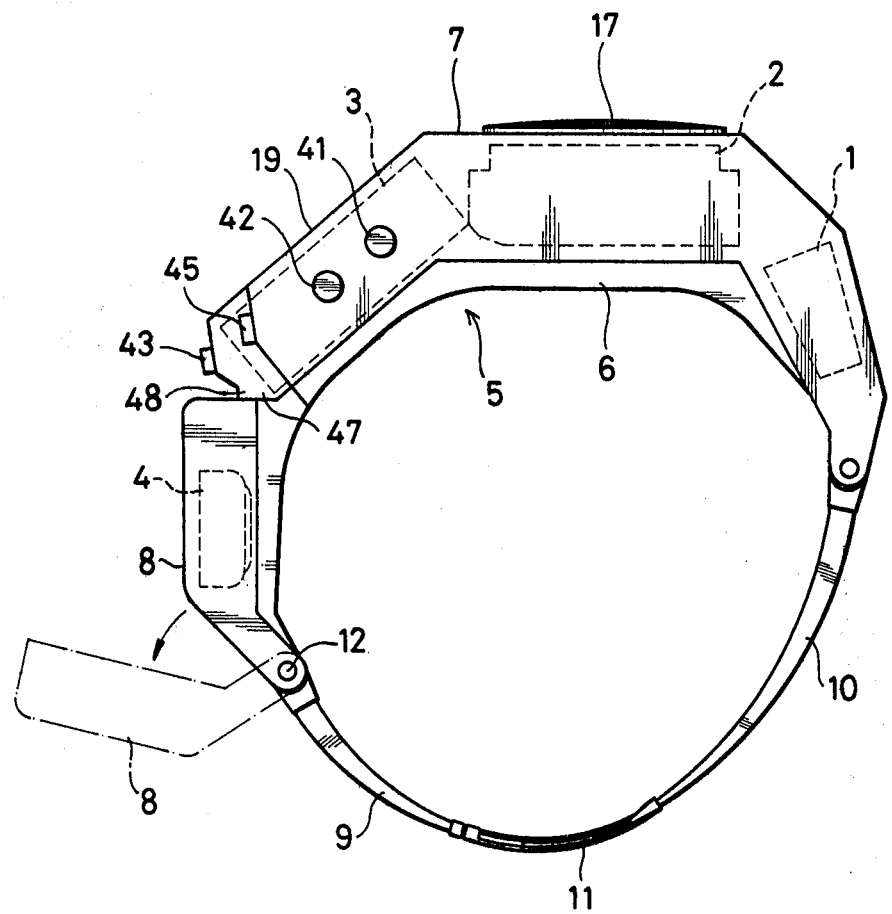
FIG. 2 is a side elevational view of the wrist AM radio receiver of FIG. 1.
Figure 3:
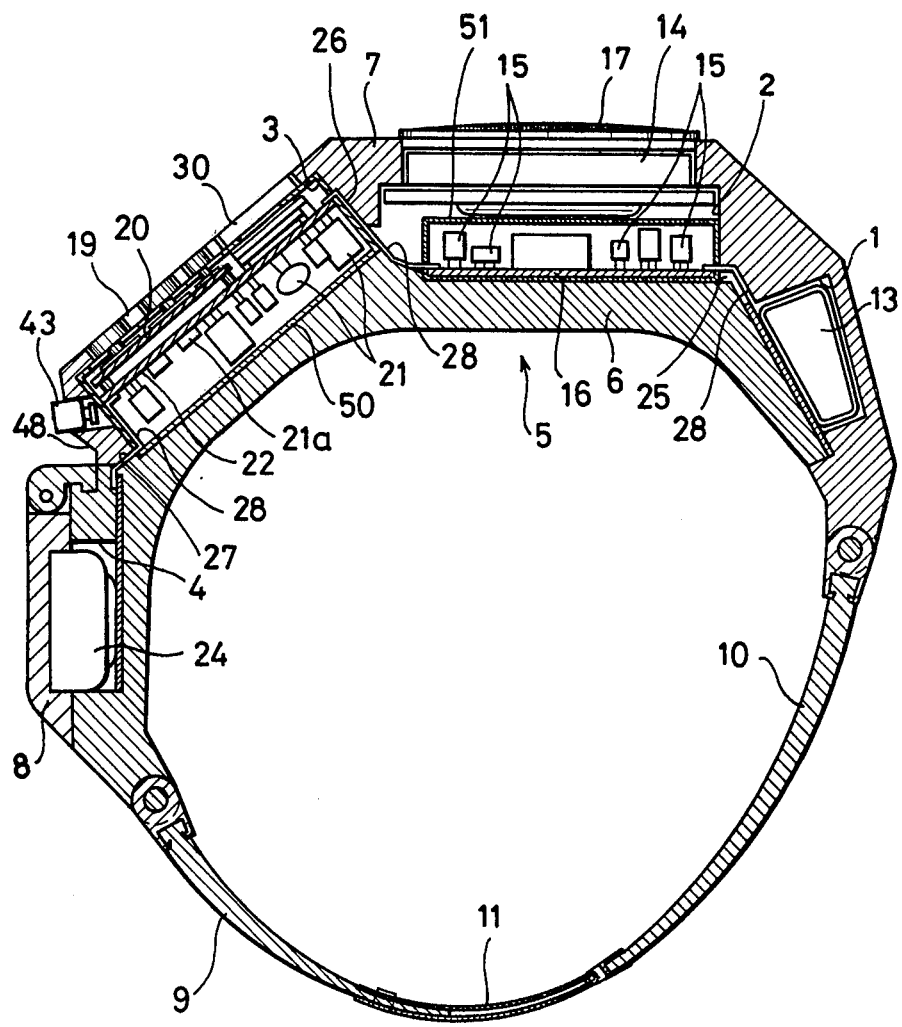
FIG. 3 is a longitudinal sectional view of the wrist AM radio receiver, as viewed in a plane parallel to the direction in which a bracelet-like structure thereof is wrapped about a user's wrist.

Referring first to FIGS. 1, 2 and 3, it will be seen that the invention is there shown applied to a wrist AM radio receiver in which a PLL synthesizer is used as a local oscillator, and further in which an electronic watch is combined with the radio receiver. In accordance with the invention, a bracelet-like structure adapted to be removably wrapped about a user's wrist or arm above the hand, as indicated in dot-dash lines at 60 on FIG. 1, defines a plurality of compartments 1, 2, 3 and 4 which are substantially isolated from each other in a main casing 5 and arranged in succession in the direction in which the bracelet-like structure is wrapped. The main casing 5 is shown to be composed of a base member 6 suitably formed of molded synthetic resin or of metal so as to have an undersurface which is curved to fit the contours of the user's wrist, and molded synthetic resin covers 7 and 8 which are mounted on base 6 for cooperating with the latter in defining the compartments 1–4.

Figure 4:
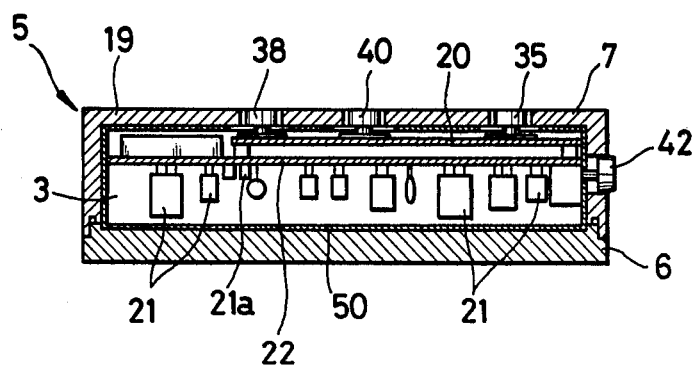
FIG. 4 is a transverse sectional view of the wrist AM radio receiver of FIG. 1 as viewed in a plane extending through an operating panel portion thereof.

More particularly, as shown on FIG. 4, cover 7 has a generally channel-shaped cross section and, as indicated on FIGS. 2 and 3, extends along that portion of base member 6 in which compartments 1, 2 and 3 are defined. Cover 7 is removably secured to base member 6 by suitable mechanical retaining member, for example, by machine screws (not shown). The other cover 8 is provided only for compartment 4 and is also of generally channel-shaped cross section. Cover 8 is pivotally mounted on base member 6, as indicated at 12 on FIG. 2, so that cover 8 can be pivotally moved between its closed position shown in full lines in FIG. 2 and its opened position indicated in dot-dash lines for providing ready axis to compartment 4. Flexible strap-like elements 9 and 10 which may be formed of leather, an elastomeric or leather-like plastic or a mesh or articulated structure, are pivotally connected to the opposite ends of main casing 6 and are engageable with each other, as by a releasable coupling or clasp 11, for completing the bracelet-like structure adapted to girdle the user's wrist.

As shown particularly in FIG. 3, a bar antenna 13 is disposed within compartment 1, and an ultra-flat speaker 14 is disposed within an outer portion of compartment 2 which further accommodates, within an inner portion of compartment 2 under speaker 14, a number of circuit components 15 mounted on a printed circuit board 16. Such circuit components 15 may, for example, function as a tuner, an IF amplifier stage and an output amplifier stage of the AM radio receiver. A grille, for example, in the form of a thin metal disc with numerous perforations for emitting sound, is mounted in an opening of cover 7 and extends across speaker 14.

The end portion of cover 7 extending over compartment 3 constitutes an operating panel 19 which, as hereinafter described in detail, is provided with a number of operating push-buttons. A printed circuit board 20 is disposed immediately under operating panels 19 within compartment 3 and is formed with conductive patterns constituting switching circuits which are selectively switched in response to depressing of the operating push-buttons. Also disposed within compartment 3 is a printed circuit board 22 on which are mounted circuit elements indicated generally at 21, and which are included in a phase-locked loop circuit (PLL) synthesizer of the AM radio receiver, and also in an electronic watch which is combined with such radio receiver. It will be particularly noted that, among the circuit elements mounted on circuit board 22 is an oscillating element 21a formed of crystal or the like, and which serves as a reference oscillation source in the PLL synthesizer for producing the local oscillation signal and/or as the source of clock pulses for the electronic watch circuit. A plurality of batteries 24, for example, mercury cells, are removably disposed in compartment 4 under pivoted cover 8. Holes 25, 26 and 27 of relatively small diameter extend between compartments 1 and 2, between compartments 2 and 3, and between compartments 3 and 4, respectively, and lead wires 28 extend through such holes 25, 26 and 27 in main casing 5 for operatively connecting the electrical various components disposed in compartments 1–4.

Figure 5:
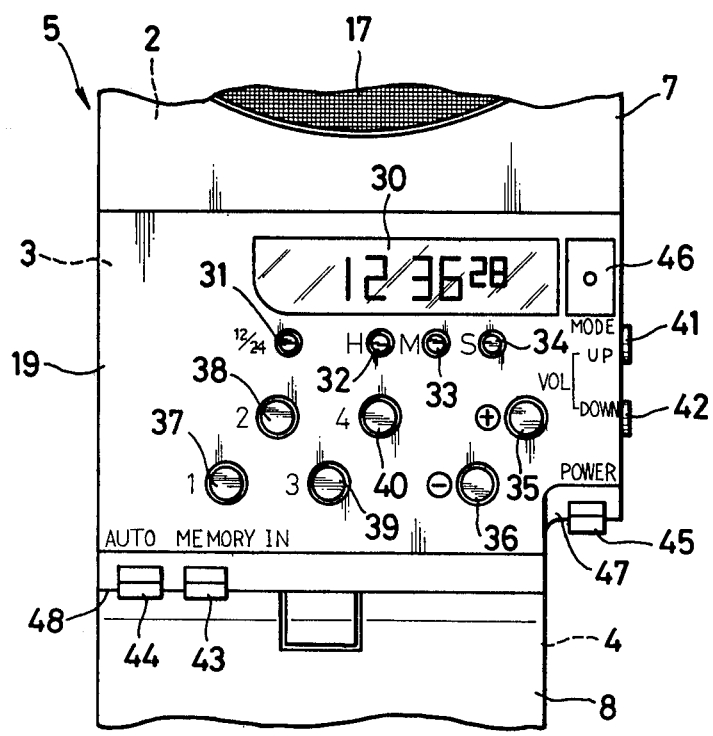
FIG. 5 is a detailed plan view of the operating panel portion of the wrist AM radio receiver of FIG. 1.

As shown particularly on FIGS. 3 and 5, operating panel 19 includes a display portion 30 employing a liquid-crystal display unit which is capable of digitally displaying either a time indicated by the electronic watch or a reception frequency of the AM radio receiver. Further, operating panel 19 has disposed therein a date adjusting push-button 31, an hour adjusting push-button 32, a minute adjusting push-button 33, a second adjusting push-button 34, auto channel-selection push-buttons 35 and 36 for causing the radio receiver to search or vary the receiving frequency in the plus and minus directions, respectively, preset frequency push-buttons 37, 38, 39 and 40 which are selectively actuable to tune the radio receiver for the reception of respective present frequencies, and volume control push-buttons 41 and 42 which are selectively actuable for increasing and decreasing, respectively, the volume of sound issuing from speaker 14. The operating panel 19 is further shown to be provided with a memory push-button 43 for storing a preset frequency, an alarm push-button 44 actuable for causing an alarm to issue from the wrist AM radio receiver at an optionally preset time, a power ON-OFF push-button 45, and a mode selecting push-button 46 for causing display portion 30 to selectively display either the time or the reception frequency of the radio receiver.

In order that the power ON-OFF push button 45 will not be inadvertently actuated, particularly when the described bracelet-like structure is wrapped about a user's wrist, a corner of operating panel 19 is formed with a right-angled cutout or notch 47 (FIGS. 1, 2 and 5) which extends laterally beyond one side of cover 8 over battery-containing compartment 4 so as to define a face at right angles to the direction in which the bracelet-like structure is wrapped and through which power ON-OFF push-button 45 extends. Further, a generally V-shaped recess 48 extends laterally between operating panel 19 and the adjacent edge surface of cover 8, and memory button 43 and alarm button 44, which are used relatively infrequently, are mounted obliquely so as to extend into groove 48 through an inclined side of the latter. Reference to FIGS. 3 and 4 will show that printed circuit boards 20 and 22 disposed within compartment 3 are preferably enclosed in a shielding case 50, and that printed circuit board 16 in compartment 2 is similarly enclosed in a shielding case 51.

In using the wrist AM radio receiver described above with reference to FIGS. 1-5, strap-like elements 9 and 10 are wrapped about the user's wrist and secured to each other by clasp 11 so as to position casing 5 against the outer portion of the user's wrist for ready access to the various push-buttons an operating panel 19 and convenient viewing of display portion 30. When operation of the AM radio receiver is desired, push-button 45 is actuated to turn ON the associated power switch, and mode-selecting push-button 46 is manipulated to the position for selecting the RADIO mode. Thereupon, either a selected one of the peset frequency-selecting push-buttons 37-40 is actuated to tune the radio receiver to the respective frequency, or the push-buttons 35 and 36 are selectively actuated to search either upwardly or downwardly for a desired broadcast frequency. In either case, display portion 30 digitally displays the frequency being received. Further, volume controlling push-buttons 41 and 42 are selectively actuated to either increase or decrease the volume until the desired level of sound is emitted from speaker 14.

It will be appreciated that, in the wrist AM radio receiver described above with reference to FIGS. 1-5, the compartments 1, 2 and 3 respectively containing bar antenna 13, speaker 14 and printed circuit board 22 with oscillating element 21a thereon are isolated from each other, and further that bar antenna 13 in compartment 1 is spaced from oscillating element 21 in compartment 3 by compartment 2 containing speaker 14. consequently, pulses generated by oscillating element 21a, or as a result of the frequency division of such generated pulses, are not readily received or picked-up by bar antenna 13 even if case 50 extending around circuit baord 22 is less than a complete shield. As a result of the foregoing, high quality broadcast reception is attained with the wrist AM radio receiver according to this invention, even though such device includes the oscillating element 21a for inclusion in the PLL synthesizer of the radio receiver and/or for providing clock pulses for the associated electronic watch. If desired, a compartment or compartments in addition to compartment 2 can be provided between compartments 1 and 3 for improving the separation of oscillating element 21a from bar antenna 13. For example, the positions of compartments 3 and 4 can be interchanged so that, in such case, oscillating element 21a on printed circuit board 22 is separated from bar antenna 13 by batteries 24 in compartment 4 in addition to the speaker and other components in compartment 2.

Whenever desired, mode selecting push-button 46 may be actuated by the user to select the watch MODE and thereby cause display portion 30 to digitally display the time determined by the electronic watch.

Figure 6:
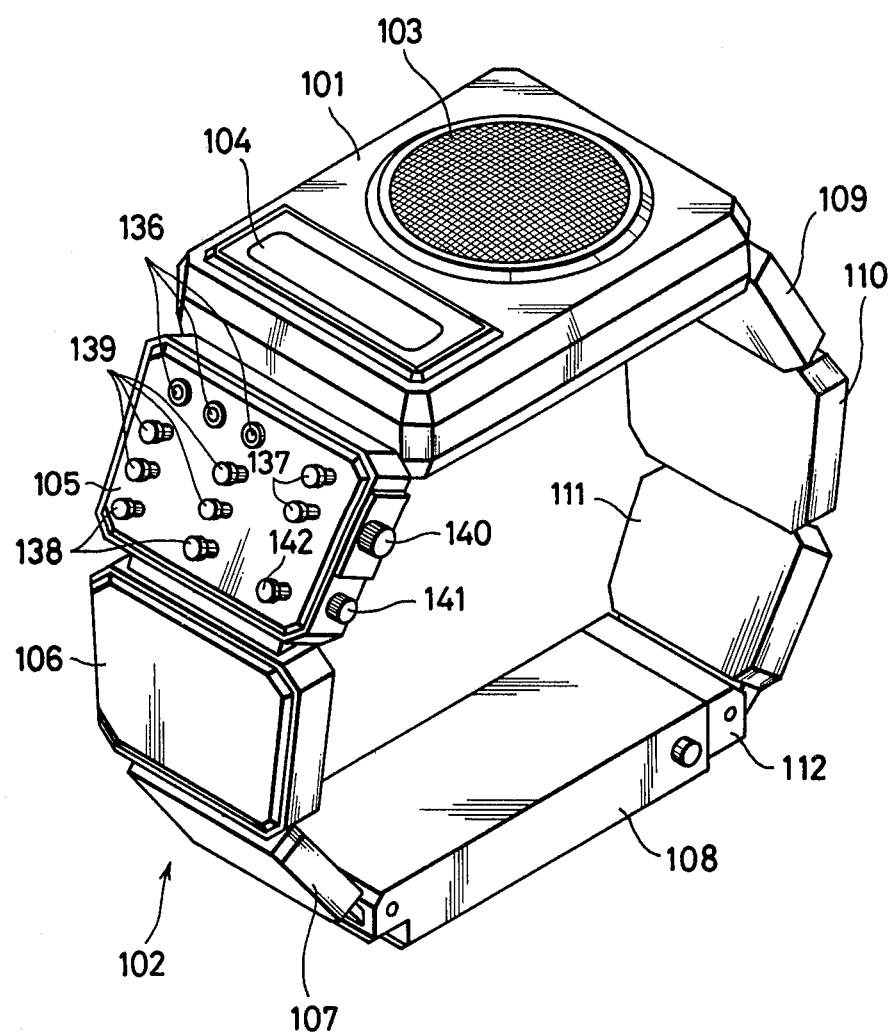
FIG. 6 is a perspective view of a wrist AM radio receiver according to another embodiment of the present invention.
Figure 7:
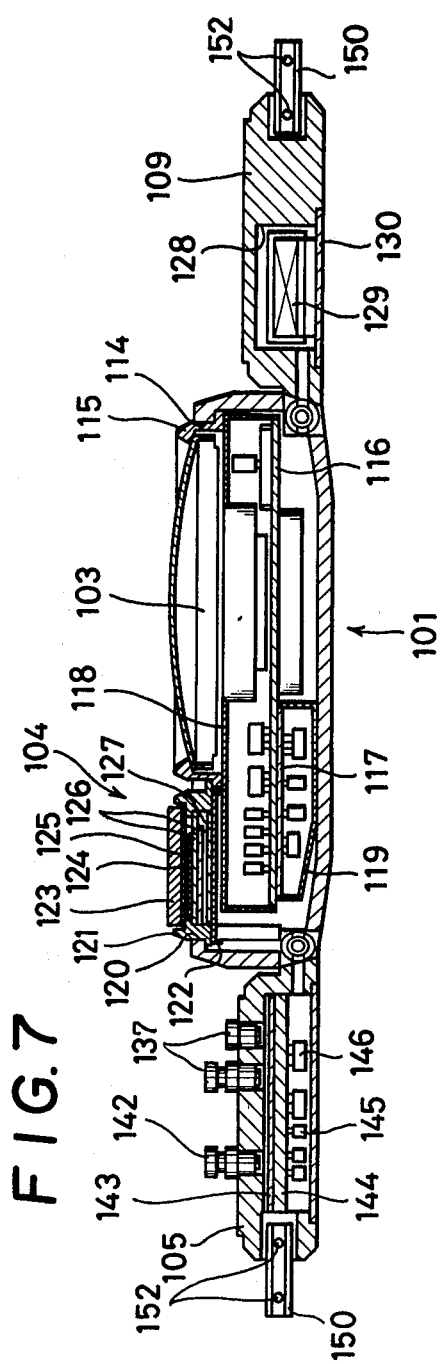
FIG. 7 is a longitudinal sectional view of a portion of the structure shown in FIG. 6.
Figure 8:
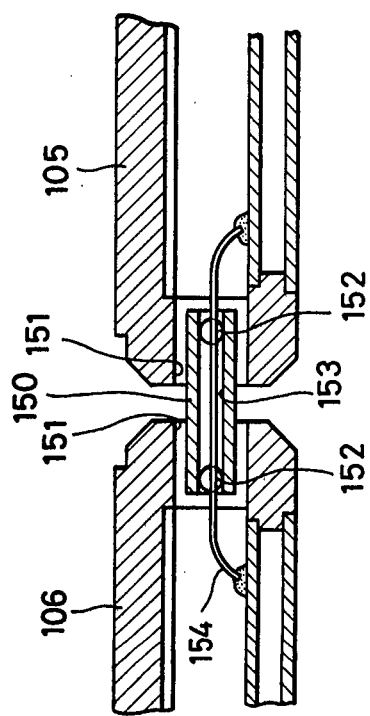
FIG. 8 is an enlarged, detailed sectional view showing a pivotal connection between successive elements making up a bracelet-like structure of the wrist AM radio receiver of FIG. 6.

Referring now to FIGS. 6-8, it will be seen that a wrist AM radio receiver according to another embodiment of this invention is in the form of a bracelet-like structure which, in this case, is made up of a plurality of relatively rigid elements pivotally connected in succession to permit the bracelet-like structure to be wrapped about, and substantially conform to the contours of the user's wrist, with at least some of the pivotally connected rigid elements being hollow to separately define respective compartments accommodating components of the radio receiver. More particularly, the bracelet-like structure in FIG. 6 is shown to comprise a substantially rectangular relatively larger central element 101 in the form of a hollow casing which, at its opposite ends, is pivotally connected to an assembly 102 of articulated elements or links. The main casing 101 accommodates a speaker 103 and a display portion 104 which, as before, digitally displays either the frequency for which the radio receiver is tuned or the time being indicated by the associate electronic watch.

The link assembly 102 is comprised of substantially rectangular links or rigid elements 105, 106, 107 and 108 pivotally connected in succession and extending pivotally from one end of main casing 101, and substantially rectangular links or rigid elements 109, 110, 111 and 112 pivotally connected in succession and extending pivotally from the other end of main casing 101. Links or rigid elements 105-108 are hollow to define respective compartments therein. More particularly, the compartment in element 105 contains an operating unit, while the next adjacent element 106 contains batteries for operating the electronic watch. The compartment defined by hollow element 107 can contain auxiliary circuit components (not shown), while the hollow element 108 which is substantially longer than the other elements 105-107 and 109-111, is intended to accommodate batteries for operation of the AM radio receiver. Furthermore, the free end portion of element 108 forms a socket for releasably receiving and retaining element 112 which forms a clasp of the bracelet-like structure. It will be seen that, when link assembly 102 is wrapped about the user's wrist and clasp element 112 is locked or retained in the socket portion of element 108 to position main casing 101 against the outside of the wrist, the relatively large element 108 containing relatively heavy batteries for operating the radio receiver is at the inside of the user's wrist, that is, opposed to the position of main casing 101 containing relatively heavy speaker 103, whereby to substantially balance the wrist AM radio receiver for avoiding turning thereof about the user's wrist.

The main casing 101 is desirably formed of metal, for example, a stainless steel or hard alloy, and is generally in the form of a flat rectangular parallel-piped, with a circular opening 114 formed in its upper or outer wall and receiving a ring 115 by which flat speaker 103 is held in position within main casing or hollow element 101 (FIG. 7). A printed circuit board 116 is also disposed in main casing 101 under speaker 103 and carries circuit components desirably arranged around the speaker to constitute a reception circuit of the AM radio receiver. Disposed under circuit board 116, and in back-to-back relation thereto, is another printed circuit board 117 having additional components of the radio reception circuit on its lower surface. The circuit components on printed circuit boards 116 and 117 are shielded by shielding cases 118 and 119, respectively, extending therearound.

A rectangular aperture 120 is also formed in the upper or outer wall of main casing 101 to one side of speaker 103 for receiving a frame 121 of display portion 104. The lower portion of frame 121 is closed by a shielding plate 122, and thereabove within frame 121, there are additionally disposed, considered from the top down, as viewed on FIG. 7, a transparent glass window 123, a name plate 124, a polarizer 125, a pair of liquid crystal glasses 126 and a liquid crystal base 127 which cooperate to provide the display portion 104 for selectively displaying the frequency for which the radio receiver is tuned or the time indicated by the electronic watch.

The hollow element or link 109 of assembly 102 is desirably formed of a synthetic resin and provided with a recess or compartment 128 which receives a bar antenna 129, and is closed by a cover 130 (FIG. 7). Bar antenna 129 and the circuti components mounted on printed circuit boards 116 and 117 within main casing 101 constitute a so-called superheterodyne reception circuit.

The hollow element or link 105 of assembly 102 is desirably formed of aluminum or stainless steel and forms the operating panel or unit, that is, all of the push-buttons necessary for controlling operation of the AM radio receiver and the electronic watch are concentrated on element 105. Such operating push-buttons are shown on FIG. 6 to include three time-adjusting push-buttons 136 for adjusting or correcting the hours, minutes and seconds, respectively, of the indicated time, and two mode selecting push-buttons 137 for respectively selecting the time indicating mode in which display portion 104 shows the present time and an alarm-setting mode in which display portion 104 shows the time at which an alarm will sound. Also provided on panel forming element 105 are two autochannel-selection push-buttons 138 selectively actuable for causing the radio receiver to search or vary the receiving frequency in the plus and minus directions, respectively, four preset frequency push-buttons 39 which are selectively actuable to tune the radio receiver for the reception of present frequencies, a push-button 140 which is actuable to select the alarm function at a preselected time, a push-button 141 actuable for controlling the volume of sound emitted from speaker 103, and a push-button 142 actuable for controlling an ON-OFF switch of the radio receiver.

As shown on FIG 7, within the hollow interior of element 105, a rubber sheet 143 which incorporates a nickel powder is superposed on a printed circuit board 144 and underlies the previously described push-buttons 136–139 and 142 of the operating panel. When any of those push-buttons is depressed, rubber sheet 143 is compressed thereby locally against the underlying circuit board 144. By reason of the presence of nickel powder in rubber sheet 143, the locally compressed portion of sheet 143 becomes electrically conductive to bridge associated electrically conductive patterns printed on the upper surface of circuit board 144 for performing a switching action. At the underside of printed circuit board 144 there are mounted an oscillating element 145 forming a reference oscillation source for the PLL synthesizer and also for the electronic watch, and an integrated circuit 146 for the electronic watch.

As shown particularly on FIG. 8, the hollow elements 105–112 of the link assembly 102 are preferably connected to each other in sequence by connecting members 150, each of which is desirably molded of synthetic resin in the form of a substantially flattened rectangular sleeve. The adjacent end portions of the hollow elements being connected, by each sleeve 150, for example, the elements 105 and 106 shown on FIG. 8, are formed with rectangular passages which loosely receive respective end portions of the respective sleeve 150. The end portions of sleeve 150 are pivotally connected, as by pins 152, to elements 105 and 106, respectively, at locations disposed inwardly of the open ends of passages 151. Thus, elements 105 and 106 are free to pivot relative to each other and relative to connecting sleeve 150, and angular displacement of such pivoting is limited by engagement of sleeve 150 with the open end edges of passages 151. Of course, the extent of the permissible pivoting can be changed by suitably selecting the clearance between sleeve 150 and the respective passages 151. It will be appreciated that each flattened sleeve 150 defines a conduit 153 through which conductive means can extend for electrically connecting the various components of the radio receiver and electronic watch disposed within different hollow elements of the bracelet-like structure. More particularly, the conductive means extending through the conduit 153 defined by each flattened sleeve 150 is desirably in the form of a flexible printed circuit board 154 formed of electrically conductive patterns printed on a flexible substrate, for example, of a synthetic resin film. It will be appreciated that, in the arrangement shown specifically on FIG. 8, electronic circuits contained in hollow element 105 and power-supply batteries contained in hollow element 106 are electrically connected by flexible printed circuit board 154 for incorporating the same in the radio receiver and electronic watch circuits.

In using the wrist AM radio receiver described above with reference to FIGS. 6–8, the pivotally connected links or elements constituting link assembly 102 are wrapped about the user's wrist and secured to each other by the engagement of clasp element 112 in the socket portion of element 108 so as to position casing 101 against the outer portion of the user's wrist. Since elements 105-112 making up assembly 102 are pivotally interconnected, in succession, by means of the flattened sleeves 150, as previously described with reference to the pivotal connection of the elements 105 and 106, it will be appreciated that link assembly 102 is adaptable to conform to the contours of the user's wrist. Since the engagements of each flattened sleeve 150 with the other ends of the respective passages 151 limits the pivoting of each of the hollow elements 105-112 relative to the respective sleeve 150, the end edges of the connected links or elements, for example, the adjacent end edges of elements 105 and 106, cannot come together, and thus cannot nip the user's skin or flesh therebetween. Further, the lead or conductive wires for connecting components and circuits situated in the various hollow elements 105-112 and being constituted by flexible printed circuit boards 154 extending through flattened sleeves 150, are not visible from the exterior, whereby to provide the wrist AM radio receiver with an improved appearance and also to prevent damage to the conductive wires or leads. The previously described limited pivoting relative to each other of the successively connected hollow elements 105-112 also contributes to the improved reliability of the electrical circuits, as the degree of bending of the flexible circuit board 154 is correspondingly restricted. Furthermore, since the various components are dispersed among hollow elements 101 and 105-112 and are interconnected by flexible printed circuit boards 154 extending through flattened sleeves 150, the size of the relatively large or main casing 101 can be limited to thereby reduce the overall size and bulk of the wrist AM radio receiver.

With the wrist AM radio receiver of FIGS. 6-8 wrapped about the user's wrist, as indicated above, the various push-buttons 136-142 extending from element 105 and display portion 104 on element or casing 101 are disposed for ready access and convenient viewing. When operation of the AM radio receiver is desired, the same is turned ON by depressing push-button 142. Thereupon, either a selected one of the preset frequency-selecting push-buttons 139 is actuated to tune the radio receiver to the respective frequency, or the push-buttons 138 are selectively actuated to search either upwardly or downwardly for a desired broadcast frequency. In either case, the tuning frequency is digitally displayed on display portion 104 so that the user, at all times, can ascertain the frequency to which the receiver has been tuned. Further, push-button 141 is actuable by the user to obtain the desired volume or level of sound issuing from speaker 103.

Since all of the operations of the AM radio receiver and the electronic watch are controlled by push-buttons on element 105 which is pivotally connected at an end of main casing 101, element 105 is somewhat tilted when the wrist on which the bracelet-like structure is wrapped is raised to a position near the user's breast. In such tilted position of element 105 constituting the operating panel, the various push-buttons thereon are most easily viewed and actuable by a finger of the user's other hand. As a result of the foregoing, the various controlling push-buttons for both the radio receiver and the electronic watch are most easily and rationally actuable.

Moreover, in the wrist AM radio receiver of FIGS. 6-8, bar antenna 129 is disposed in hollow element 109 formed of a synthetic resin so that such hollow element 109 does not interfere with the reception of radio waves by the antenna and improved reception sensitivity is attained. Further, since bar antenna 129 is not disposed within casing 101, the latter can be formed of stainless steel or another suitably hard metal for providing the radio receiver with high mechanical strength and a high-quality appearance, while the size of casing 101 can be reduced, as previously indicated, for improving the appearance and reducing the weight thereof.

Furthermore, the hollow element 105 which constitutes the operating panel is also desirably formed of metal so that the contained oscillating element 145 and integrated watch circuit 146 are thereby shielded to prevent the bar antenna 129 from receiving noise from the oscillating element 145 and/or the watch circuit 146. The radio receiver circuits formed on printed circuit boards 116 and 117 are also shielded by shielding cases 118 and 119, respectively, and by the metallic casing 101, and thus are prevented from receiving noise so that high quality sound issues from speaker 103. Of course, as in the first-described embodiment of the invention, bar antenna 129 in hollow element 109 is spaced from oscillating element 145 in hollow element 105 by the intervening hollow element or casing 101 containing speaker 103. Thus, apart from the shielding aspect of metal hollow element 105, the reception of the pulses from oscillating element 145 by antenna 129 is avoided by the relatively large distance of antenna 129 from element 145, even though the size of casing 101 is desirably reduced.

When it is desired to use the electronic watch, it is merely necessary to depress a respective one of the watch mode selecting push-buttons 137 and thereby cause display portion 104 to digitally display the time then being indicated. If the other one of push-buttons 137 is depressed, display portion then shows the times for which the alarm is set. It will be appreciated that the use of a single display portion 104 for selectively displaying either the time or the frequency for which the radio receiver is tuned makes it possible to reduce the overall size of the structure.

Having described preferred embodiments of the invention in detail with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A wrist AM radio receiver comprising a bracelet-like structure adapted to be removably wrapped about a user's wrist, a bar antenna, a circuit board having thereon oscillating means forming a reference oscillation source, said bar antenna and said circuit board having oscillating means thereon being spaced apart within said bracelet-like structure in the direction in which the latter is wrapped, and at least a speaker also disposed in said bracelet-like structure between said bar antenna and said circuit board with oscillating means thereon so as to minimize the influence on said bar antenna of pulses from said reference oscillation source.

2. A wrist AM radio receiver according to claim 1; in which said bracelet-like structure defines a plurality of compartments arranged in succession in said structure in said direction in which the latter is wrapped, said bar antenna and said circuit board having oscillating means thereon are respectively contained in first and second ones of said compartments which are spaced from each other in said direction by at least another of said compartments, and said speaker is contained in said other compartment.

3. A wrist AM radio receiver according to claim 2; in which said bracelet-like structure includes a main casing in which are disposed said first and second compartments and at least said other compartment therebetween, said main casing has holes therein for communicating said first, second and other compartments each with the other, and lead wires extend through said holes for operatively connecting at least said bar antenna, said circuit board and said speaker.

4. A wrist AM radio receiver according to claim 3, in which said main casing includes a base member having a curved under surface shaped to conform to the user's wrist contours, and a cover removably secured on said base member to cooperate with the latter in defining said compartments therebetween.

5. A wrist AM radio receiver according to claim 3; in which said main casing defines an additional compartment at the side of said second compartment directed away from said other compartment; and further comprising battery means in said additional compartment.

6. A wrist AM radio receiver according to claim 5; in said main casing includes a base member having an under surface curved to fit the contours of the user's wrist, a first cover removably secured on said base member to cooperate with the latter in defining said first, second and other compartments therebetween, and a second cover pivoted on said base member to move between an opened position and a closed position where said second cover cooperates with a respective portion of said base member to define said additional compartment for said battery means.

7. A wrist AM radio receiver according to claim 3; in which said bracelet-like structure further includes strap elements extending from opposite ends of said main casing for completing the girdling of the user's wrist.

8. A wrist AM radio receiver according to claim 2; in which said bracelet-like structure includes a plurality of relatively rigid elements, at least some of which are hollow to separately define said first, second and other compartments, respectively, therein, and pivot means connecting said elements in succession to permit said bracelet-like structure to substantially conform to the contours of the user's wrist.

9. A wrist AM radio receiver according to claim 8; in which the successive elements have passages extending logitudinally through their adjacent ends from the compartments respectively defined in said elements, each said pivot means includes a flattened sleeve having end portions loosely engaging in said passages through the adjacent ends of said elements connected thereby and means pivotally connecting said end portions of the flattened sleeve to said elements inwardly of the open ends of said passages so that the angular displacement of successive pivotally connected elements is limited by engagement of the respective sleeve with edges of said passages at said open ends thereof; and further comprising conductive means extending through each said flattened sleeve for effecting electrical connections therethrough.

10. A wrist AM radio receiver according to claim 9; in which said conductive means is constituted by a printed circuit on a flexible substrate.

11. A wrist AM radio receiver according to claim 1; in which said reference oscillation source is included in a phase-locked loop circuit for synthesizing a selected local oscillation in the receiver.

12. A wrist AM radio receiver according to claim 1; further comprising an electronic watch housed in said bracelet-like structure and employing said reference oscillation source for generating clock pulses.

13. A wrist AM radio receiver according to claim 12; further comprising display means selectively operative to display a received frequency for which the radio receiver is tuned and a time indicated by said electronic watch, said display means being disposed in addition to said speaker between said bar antenna and said oscillating means on said circuit board.

14. A wrist AM radio receiver according to claim 1; in which said bracelet-like structure has an outwardly facing surface defining an operating panel which is formed with a notched corner defining a face at right angles to said direction in which the bracelet-like structure is wrapped about the user's wrist, and further comprising a power switch operable by a push-button extending through said face so as to be shielded in said notched corner against inadvertent operation.

15. A wrist AM radio receiver according to claim 1; in which said bracelet-like structure has an outwardly facing surface defining an operating panel, a generally V-shaped groove is formed along a margin of said panel, and operating push-buttons extend through a side of said groove into the latter.

16. A wrist AM radio receiver according to claim 1; in which said bracelet-like structure includes a plurality of relatively rigid elements pivotally connected in succession to permit said bracelet-like structure to substantially conform to the user's wrist when wrapped about the latter, at least a plurality of said elements are hollow to define respective compartments therein, said bar antenna and said circuit board having oscillating means thereon are disposed in said compartments of different elements, respectively, of said bracelet-like structure and said speaker is disposed in one of said compartments between said bar antenna and said circuit board; and further comprising batteries for powering the radio receiver disposed in another of said compartments which is substantially opposed to the compartment containing said speaker when said bracelet-like structure is wrapped about the user's wrist.

* * * * *